(12) United States Patent
Wei (10) Patent No.: US 11,503,550 B2
(45) Date of Patent: Nov. 15, 2022

(54) INFORMATION TRANSMISSION METHOD AND APPARATUS FOR MOBILE TERMINAL

(71) Applicant: Beijing Zhigu Rui Tuo Tech Co., Ltd, Beijing (CN)

(72) Inventor: Na Wei, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 0 days.

(21) Appl. No.: 15/568,435

(22) PCT Filed: Apr. 22, 2016

(86) PCT No.: PCT/CN2016/079957
§ 371 (c)(1),
(2) Date: Oct. 20, 2017

(87) PCT Pub. No.: WO2016/169505
PCT Pub. Date: Oct. 27, 2016

(65) Prior Publication Data
US 2018/0160374 A1  Jun. 7, 2018

(30) Foreign Application Priority Data
Apr. 24, 2015 (CN) .......................... 201510201500.6

(51) Int. Cl.
*H04W 52/14* (2009.01)
*H04W 40/22* (2009.01)
(Continued)

(52) U.S. Cl.
CPC ........... *H04W 52/146* (2013.01); *H04W 4/46* (2018.02); *H04W 40/22* (2013.01);
(Continued)

(58) Field of Classification Search
CPC ....... H04W 4/70; H04W 40/00; H04W 52/28; H04W 52/146; H04W 72/0413;
(Continued)

(56) References Cited

U.S. PATENT DOCUMENTS 9,549,428 B2   1/2017  Xu
9,699,692 B2 * 7/2017  Brahmi ................. H04W 72/04
(Continued)

FOREIGN PATENT DOCUMENTS

CN        1430452 A     7/2003
CN      101316426 A    12/2008
(Continued)

OTHER PUBLICATIONS

International Search Report for PCT Application No. PCT/CN2016/079957, dated Jul. 11, 2016, 3 pages.
(Continued)

*Primary Examiner* — Raymond S Dean
(74) *Attorney, Agent, or Firm* — Amin, Turocy & Watson, LLP (57) ABSTRACT

An information transmission method and apparatus for a mobile terminal is provided. A method comprises: determining an uplink transmit power of the mobile terminal; and sending, in response to that the uplink transmit power falls within a preset range, to at least one forwarding node, indication information for instructing to forward measured data of the mobile terminal. According to the method and apparatus of the embodiments of the present application, forwarding of measured data is triggered according to an uplink transmit power of a mobile terminal, so as to facilitate reducing signaling overheads and delay caused by unnecessary forwarding, thereby improving the forwarding efficiency.

21 Claims, 3 Drawing Sheets

(51) Int. Cl.
*H04W 4/46* (2018.01)
*H04W 52/28* (2009.01)
*H04W 76/14* (2018.01)
*H04W 72/04* (2009.01)

(52) U.S. Cl.
CPC ........ *H04W 52/281* (2013.01); *H04W 72/048* (2013.01); *H04W 72/0413* (2013.01); *H04W 76/14* (2018.02); *Y02D 30/70* (2020.08)

(58) Field of Classification Search
CPC ..... H04W 72/048; H04W 4/46; H04W 40/22; H04W 76/14; Y02D 30/70
See application file for complete search history.

(56) References Cited

U.S. PATENT DOCUMENTS

| | | | | |
|---|---|---|---|---|
| 9,820,113 | B2* | 11/2017 | Klang | H04W 4/12 |
| 2005/0088318 | A1* | 4/2005 | Liu | G08G 1/0965 |
| | | | | 340/902 |
| 2009/0154375 | A1* | 6/2009 | Coskun | H04L 41/12 |
| | | | | 370/254 |
| 2010/0019932 | A1* | 1/2010 | Goodwin | G08G 1/162 |
| | | | | 340/902 |
| 2012/0290146 | A1* | 11/2012 | Dedes | G01C 21/3697 |
| | | | | 701/1 |
| 2014/0046569 | A1 | 2/2014 | Mohn et al. | |
| 2014/0185587 | A1* | 7/2014 | Jang | H04W 36/14 |
| | | | | 370/331 |
| 2015/0029866 | A1* | 1/2015 | Liao | H04W 48/14 |
| | | | | 370/241 |
| 2016/0212681 | A1* | 7/2016 | Linden | H04W 40/12 |
| 2016/0374030 | A1* | 12/2016 | Koutsimanis | H04W 52/343 |
| 2017/0086150 | A1* | 3/2017 | Wang | H04W 52/00 |
| 2017/0251507 | A1* | 8/2017 | Fodor | H04W 76/023 |

FOREIGN PATENT DOCUMENTS

| | | | |
|---|---|---|---|
| CN | 101651476 | A | 2/2010 |
| CN | 101657012 | A | 2/2010 |
| CN | 101754223 | A | 6/2010 |
| CN | 101778427 | A | 7/2010 |
| CN | 101888667 | A | 11/2010 |
| CN | 102037458 | A | 4/2011 |
| CN | 102932869 | A | 2/2013 |
| CN | 103167024 | A | 6/2013 |
| CN | 103179575 | A | 6/2013 |
| CN | 103237332 | A | 8/2013 |
| CN | 103249105 | A | 8/2013 |
| CN | 103327593 | A | 9/2013 |
| CN | 101741432 | B | 2/2014 |
| CN | 103561447 | A | 2/2014 |
| CN | 103716881 | A | 4/2014 |
| CN | 103781198 | A | 5/2014 |
| CN | 104244392 | A | 5/2014 |
| CN | 104105158 | A | 10/2014 |
| CN | 103327593 | B | 6/2016 |
| CN | 103781198 | B | 4/2017 |
| WO | 2013114203 | A3 | 2/2014 |
| WO | 2014051473 | A1 | 4/2014 |
| WO | 2015017187 | A1 | 2/2015 |

OTHER PUBLICATIONS

Chinese Office Action dated Dec. 27, 2018 for Chinese Application No. 201510201500.6, 15 pages (with translation).
Second Office Action Chinese Application No. 201510201500.6, dated Aug. 20, 2019, 7 Pages.

* cited by examiner

INFORMATION TRANSMISSION METHOD AND APPARATUS FOR MOBILE TERMINAL

RELATED APPLICATION

The present application is a U.S. National Stage filing under 35 U.S.C. § 371 of international patent cooperation treaty (PCT) application No. PCT/CN2016/079957, filed Apr. 22, 2016, and entitled "INFORMATION TRANSMISSION METHOD AND APPARATUS FOR MOBILE TERMINAL", which claims the benefit of priority to Chinese Patent Application No. 201510201500.6, filed with the Chinese Patent Office on Apr. 24, 2015, which applications are hereby incorporated into the present application by reference herein in their respective entireties.

TECHNICAL FIELD

Embodiments of the present application relate to the field of technologies of the Internet of Vehicles, and, for example, to an information transmission method and apparatus for a mobile terminal.

BACKGROUND

With the rapid development of mobile device-related technologies, people have more and more demands on mobile devices, and application scenarios of mobile devices become more complex. Accordingly, measured data related to movement of a mobile terminal (for example, a moving speed, a location, and a direction) can provide more convenience for a user. For example, in an on-board use scenario, a mobile terminal (a vehicle or a mobile device in the vehicle (collectively referred to as a mobile terminal in this specification)) can share measured data, comprising data, such as a speed, a location, a traveling direction and braking, of the vehicle with another vehicle by means of Vehicle-to-Vehicle (V2V) communication, so as to provide a data basis for safer and more convenient traveling of a user.

The V2V communication uses a wireless network. A dedicated short range communications (DSRC) technology is usually used. The DSRC is a Wi-Fi-like network, and has a theoretical maximum coverage area of 300 meters at most, but the actual coverage area is smaller. A transmission range of an on-board mobile terminal can be expanded by using each mobile terminal as a forwarding node, but a relatively large number of times of forwarding are required in order to achieve a broader transmission range, and once an event occurs, there is a limited time for a user to deal with the event. A cellular technology with a broader transmission range, for example, a Device-to-Device (D2D) communications technology in a cellular network system (for example, a Long Term Evolution (LTE) network system) can be used to assist the V2V communication. With the assistance of the cellular technology, the forwarding number can be reduced while expanding the transmission range of the on-board mobile terminal; however, regardless of whether the DSRC technology or the cellular technology is used to perform forwarding, if each mobile terminal serves as a forwarding node, each forwarding would lead to high signaling overheads and delay. Therefore, a more effective forwarding solution is urgently needed.

SUMMARY

In view of the above, one example of a non-limiting object of embodiments of the present application is to provide an information transmission solution for a mobile terminal, so as to implement effective forwarding.

In order to achieve the foregoing objective, in a first aspect, an example embodiment of the present application provides an information transmission method for a mobile terminal, comprising:

determining an uplink transmit power of the mobile terminal; and sending, in response to that the uplink transmit power falls within a preset range, to at least one forwarding node, indication information for instructing to forward measured data of the mobile terminal.

In a second aspect, an example embodiment of the present application provides an information transmission apparatus for a mobile terminal, comprising:

a first determining module, configured to determine an uplink transmit power of the mobile terminal; and a first transmission module, configured to send, in response to that the uplink transmit power falls within a preset range, to at least one forwarding node, indication information for instructing to forward measured data of the mobile terminal.

In a third aspect, an example embodiment of the present application provides a computer readable storage device, comprising at least one executable instruction, which, in response to execution, causes a system comprising a processor to perform operations, comprising:

determining an uplink transmit power of the mobile terminal; and sending, in response to that the uplink transmit power falls within a preset range, to at least one forwarding node, indication information for instructing to forward measured data of the mobile terminal.

In a fourth aspect, an example embodiment of the present application provides a device for information transmission comprising a processor and memory, wherein the memory storing a computer executable instruction, the processor being connected with the memory via a communication bus, and when the device is operating, the processor executes or facilitates execution of the executable instructions stored by the memory:

determining an uplink transmit power of the mobile terminal; and sending, in response to that the uplink transmit power falls within a preset range, to at least one forwarding node, indication information for instructing to forward measured data of the mobile terminal.

According to the method and apparatus of example embodiments of the present application, forwarding of measured data is triggered according to an uplink transmit power of a mobile terminal, so as to facilitate reducing signaling overheads and delay caused by unnecessary forwarding, thereby improving the forwarding efficiency.

DETAILED DESCRIPTION

Example embodiments of the present application are further described in detail below with reference to the accompanying drawings and embodiments. The following embodiments are intended to describe the present application, but not to limit the scope of the present application.

It should be understood that the terms "first", "second", and the like are merely used to distinguish different devices, modules, parameters, and the like, and neither represent any special technical meaning, nor represent a necessary logical sequence therebetween.

In the embodiments of the present application, the "mobile terminal" may be any movable user equipment or any equipment capable of moving while driven by a movable platform (for example, a transportation vehicle) and that has signal receiving and transmitting functions. Such a device may comprise any terminal device, for example, a mobile phone, a wearable device, a PC, a vehicle, an on-board device, and any other portable device.

When using the D2D communication mode, a user equipment can transmit a D2D signal by using an uplink spectrum of a cellular network system. Because of a near-far effect problem in a cellular network, uplink power control needs to be performed on the user equipment, that is, the maximum uplink transmit power of the user equipment needs to be controlled. The uplink transmit power control is very important and balances requirements for two aspects: In one aspect, enough energy needs to be provided for transmission of information bits so as to ensure Quality of Service (QoS). In the other aspect, interference to another user needs to be reduced as much as possible and battery consumption of the user equipment needs to be reduced. By means of uplink power control, the maximum transmit power of a user equipment relatively close to the base station is reduced by a large amount, so as to avoid interfering with a signal of user equipment in the distance. Transmission of a D2D signal is also based on a similar principle. For example, currently, a relevant 3GPP standard TS 36.213 v12.5.0 provides a formula for transmit power control in D2D communications, which is:

$$P_{PSDCH} = \min\{P_{CMAX,PSDCH}, 10\log_{10}(M_{PSDCH}) + P_{O\_PSDCH,1} + \alpha_{PSDCH,1} \cdot PL\}_{[dBm]}$$

Figure 1:
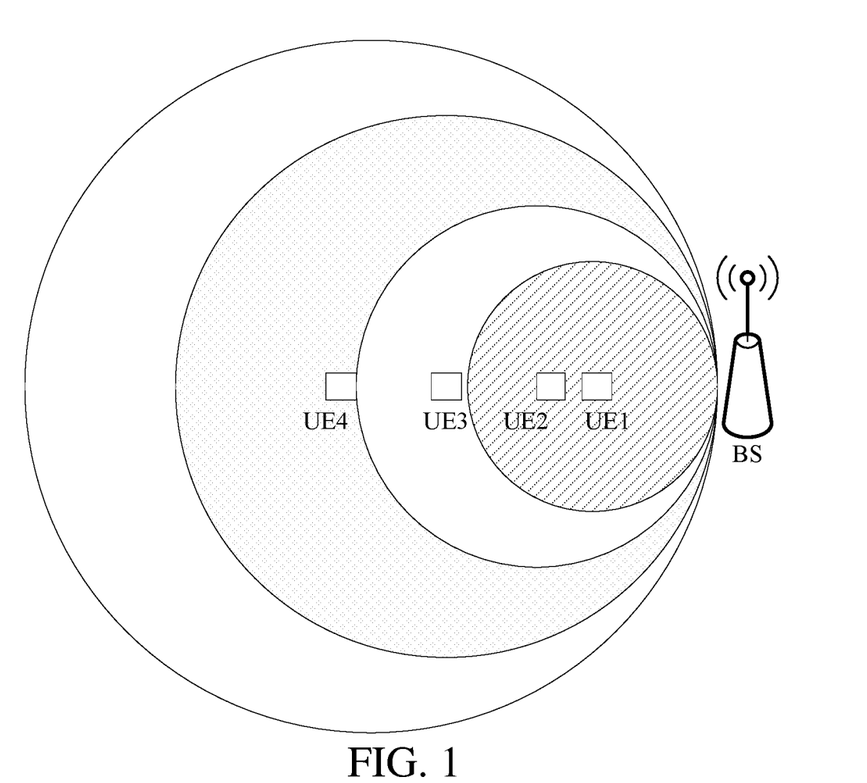
FIG. 1 is an example schematic diagram illustrating different coverage areas of D2D signals that can be transmitted by user equipments at different distances from a base station.

One part is the path loss estimation PL. According to this formula, FIG. 1 briefly shows different coverage areas of D2D signals that can be transmitted by user equipments with different distances from a base station. As shown in FIG. 1, the respective distances between each user equipments, UE1, UE2, UE3, and UE4, and the base station (BS) is in an increase order, the respective maximum uplink transmit powers of each the user equipments, UE1, UE2, UE3, and UE4 is in an increase order, the respective coverage areas of D2D signals transmitted by each of those four user equipments is in an increase order, and coverage areas of D2D signals of UE1 to UE4 are represented in FIG. 1 by four circular areas approximatively, of which the radius is in an increasing order. In other words, a D2D signal transmitted by UE4 can be received by UE1 directly, and a D2D signal transmitted by UE1 needs to be forwarded by another UE in order to be received by UE4. When the D2D communication mode is used together with the DSRC communication mode to expand the effective transmission range of a V2V signal, a D2D signal of UE4 actually can be received by UE1 without being forwarded by UE3 and UE2. In technical solutions of the embodiments of the present application, forwarding of measured data is selectively triggered on the basis of the above, so as to avoid unnecessary forwarding on the basis of expanding the forwarding coverage area of a mobile terminal.

Figure 2:
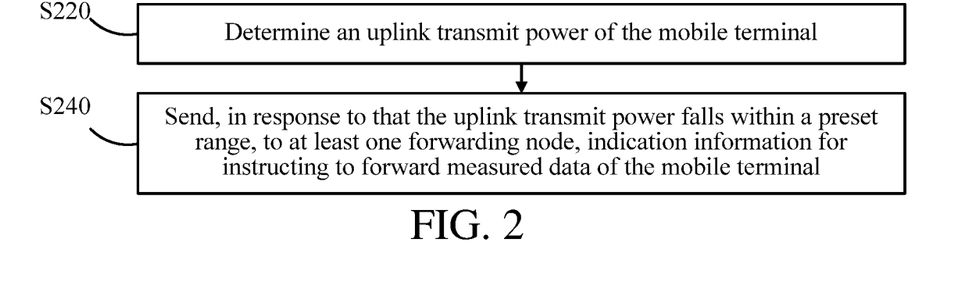
FIG. 2 is an example flowchart of an information transmission method for a mobile terminal according to an embodiment of the present application.

FIG. 2 is a flowchart of an information transmission method for a mobile terminal according to an embodiment of the present application. The method may be executed by any mobile terminal. As shown in FIG. 2, the method comprises:

S220. Determine an uplink transmit power of the mobile terminal.

In the method of this embodiment, the uplink transmit power of the mobile terminal is the maximum uplink D2D transmit power of the mobile terminal, and according to the uplink D2D transmit power of the mobile terminal, a maximum coverage area of a D2D signal of the mobile terminal can be estimated.

S240. Send, in response to that the uplink transmit power falls within a preset range, to at least one forwarding node, indication information for instructing to forward measured data of the mobile terminal.

In the embodiments of the present application, the "measured data" may comprise any information associated with a running state or a device state of the mobile terminal, that is, comprise information associated with at least one of the following of the mobile terminal: a moving speed, a location, a moving direction, braking, and the like. In the method of this embodiment, an effective transmission range of the mobile terminal during V2V communication can be determined according to the maximum coverage area of the D2D signal corresponding to the mobile terminal, and therefore, forwarding of the measured data of the mobile terminal can be selectively triggered.

Different preset ranges may be set for respective mobile terminals, and the preset range may be determined by the mobile terminal or a base station of a cell to which the mobile terminal attaches according to at least a transmission requirement of measured data, a congestion level of a transmission channel, a geographical location of the mobile terminal, a density of other mobile terminals near the mobile terminal, and the like. In an implementation manner in which the base station sets the preset range, the preset range may be sent by using radio resource control (RRC) related signaling sent by the base station to each mobile terminal attaches, that is, the RRC related signaling may comprise a field/information related to the preset range. For example, in a scenario shown in FIG. 1, if it is intended to only allow a UE that is at a distance from the base station less than or equal to that of UE1 to enter a forwarding mode, the preset range may be set to cause that only forwarding of measured data of UEs having an uplink transmit power less than or equal to the uplink transmit power of UE1 is triggered.

In summary, according to the method of this embodiment, forwarding of measured data is triggered according to an uplink transmit power of a mobile terminal, so as to facilitate reducing signaling overheads and delay caused by unnecessary forwarding, thereby improving the forwarding efficiency.

The indication information may comprise a forwarding request for the measured data. In an example embodiment, the at least one forwarding node may make a response to the received forwarding request, and the mobile terminal may send the measured data on the basis of the response. In this implementation manner, the method of this embodiment may further comprise:

S260. Send the measured data in response to that a response to the forwarding request is received.

For example, the measured data is sent to a forwarding node that responds to the forwarding request and is determined as being capable of/suitable for forwarding the measured data for the mobile terminal.

In another example embodiment, the indication information may comprise a forwarding request for the measured data and the measured data, and the at least one forwarding node that receives the indication information may directly determine, according to the forwarding request, to forward the measured data.

In still another example embodiment, the mobile terminal and/or the measured data of the mobile terminal may also be given a certain forwarding priority, and the forwarding node forwards measured data from multiple mobile terminals according to different priorities, so as to help further improve the forwarding efficiency. In this implementation manner, the indication information may further comprise a forwarding priority of the measured data. The priority may be an inherent and fixed priority of the mobile terminal and fixed; or may be determined according to at least the measured data and may change as the measured data changes. For example, it is deduced from a moving speed and a braking status of the mobile terminal that the mobile terminal is braking in emergency and may be in an accident scenario; therefore, the mobile terminal may set a relatively high forwarding priority for the measured data.

It should be noted that because the uplink transmit power of the mobile terminal may change, step S220 may be performed in real time, regularly, or irregularly. In this implementation manner, after step S240, the method may further comprise:

S250. Stop, in response to that the uplink transmit power does not fall within the preset range, sending the forwarding request to the at least one forwarding node.

In this case, the mobile terminal still sends the measured data out, but the at least one forwarding node that receives the measured data no longer forwards the measured data.

Further, in order to implement effective forwarding of the measured data, the method of this embodiment of the present application may further comprise:

S230. Determine a resource configuration associated with the measured data.

The resource configuration may comprise, but is not limited to, at least one of the following configurations associated with forwarding of the measured data: an ID used by the mobile terminal in sending the measured data and/or an ID used by the at least one forwarding node in forwarding the measured data, a resource used by the mobile terminal in sending the measured data and/or a resource used by the at least one forwarding node in forwarding the measured data, a maximum number of hops of the measured data, and the like. In step S230, the resource configuration may be determined by the mobile terminal by using any method that is mature in the art. For example, competing for available resource according to certain contention mechanism, or a dedicated resource previously allocated to the mobile terminal is determined. In step S230, the information associated with the resource configuration may be acquired by communicating with the base station of the cell to which the mobile terminal attaches, to determine a dedicated resource that is reallocated by the base station to the mobile terminal. In step S240, the indication information is sent according to the resource configuration determined in step S230, and a corresponding configuration setting is comprised in the indication information when necessary. In addition, in this implementation manner, step S230 further comprises:

S232. Send a resource configuration request to a base station of a cell to which the mobile terminal attaches.

S234. Receive information associated with the resource configuration, for example, receive information that is associated with the resource configuration and that is from the base station of the cell to which the mobile terminal attaches.

In addition, the mobile terminal may send the measured data to the at least one forwarding node by using various suitable communication modes, so as to implement forwarding in different coverage areas.

In an example embodiment, in step S240, the indication information may be sent by using the DSRC communication mode; in this implementation manner, the at least one forwarding node at least comprises a neighboring mobile terminal of the mobile terminal and may also comprise a fixed device (for example, an intelligent traffic light) within a transmission distance of a DSRC signal of the mobile device. In another example embodiment, in step S240, the indication information may be sent to the at least one forwarding node by using the D2D communications technology; in this implementation manner, the at least one forwarding node still comprises at least a neighboring mobile terminal of the mobile terminal and may also comprise a fixed device (for example, an intelligent traffic light) within a transmission distance of a DSRC signal of the mobile device. In still another example embodiment, the at least one forwarding node comprises a base station of a cell to which the mobile terminal attaches, and in step S240, the indication information may be sent to at least the base station of the cell to which the mobile terminal attaches; in this implementation manner, the base station as a forwarding node may send the indication information to a mobile terminal in the serving cell according to a forwarding requirement for the measured data, or forward the indication information to another base station in a neighboring cell to enable the another base station in the neighboring cell to send the indication information to a mobile terminal in the cell covered by the another base station, so as to further expand the forwarding coverage area of the measured data of the mobile terminal; or, the base station may forward the indication information to a mobile terminal in the serving cell and another base station in a neighboring cell.

In summary, the method of this embodiment can be used to implement effective forwarding of measured data of a mobile terminal.

It should be understood by a person skilled in the art that in the foregoing method of specific embodiments of the present application, the value of the serial number of each step does not mean an execution sequence, and the execution sequence of each step should be determined according to the function and internal logic thereof, and should not be any limitation on the implementation procedure of the specific embodiments of the present application.

In addition, an embodiment of the present application further provides a computer-readable medium, comprising a computer-readable instruction for performing the following operation when being executed: performing an operation of each step in the method of the embodiment shown in FIG. 2.

Figure 3A:
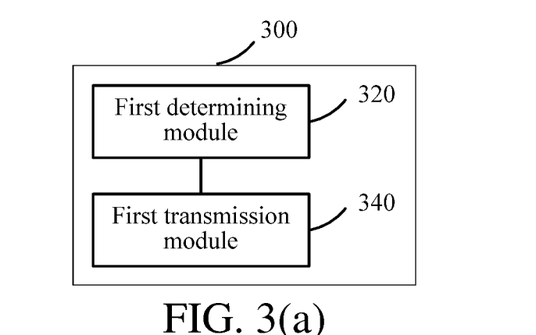
FIG. 3(a) to FIG. 3(d) are example schematic structural diagrams of multiple examples of an information transmission apparatus for a mobile terminal according to an embodiment of the present application.

An embodiment of the present application further provides an apparatus for executing the foregoing information transmission method for a mobile terminal, and the apparatus may belong to any mobile terminal. In addition to constituent parts described below, the apparatus further comprises a communications module that can implement communication with any device outside the apparatus according to requirements. As shown in FIG. 3(a), an information transmission apparatus 300 for a mobile terminal according to an embodiment of the present application comprises a first determining module 320 and a first transmission module 340.

The first determining module 320 is configured to determine an uplink transmit power of the mobile terminal.

In the method of this embodiment, the uplink transmit power of the mobile terminal is the maximum uplink D2D transmit power of the mobile terminal, and according to the uplink D2D transmit power of the mobile terminal, a maximum coverage area of a D2D signal of the mobile terminal can be estimated.

The first transmission module 340 is configured to send, in response to that the uplink transmit power falls within a preset range, to at least one forwarding node, indication information for instructing to forward measured data of the mobile terminal.

In the embodiments of the present application, the "measured data" may comprise any information associated with a running state or a device state of the mobile terminal, that is, comprise information associated with at least one of the following of the mobile terminal: a moving speed, a location, a moving direction, braking, and the like. In the method of this embodiment, an effective transmission range of the mobile terminal during V2V communication can be determined according to the maximum coverage area of the D2D signal corresponding to the mobile terminal, and therefore, forwarding of the measured data of the mobile terminal can be selectively triggered.

Different preset ranges may be set for respective mobile terminals, and the preset range may be determined by the mobile terminal or a base station of a cell to which the mobile terminal attaches according to at least a transmission requirement of measured data, a congestion level of a transmission channel, a geographical location of the mobile terminal, a density of other mobile terminals near the mobile terminal, and the like. In an implementation manner in which the base station sets the preset range, the preset range may be sent by using radio resource control (RRC) related signaling that is sent by the base station to each mobile terminal attaches, that is, the RRC related signaling may comprise a field/information related to the preset range. For example, in the scenario shown in FIG. 1, if it is intended to only allow a UE that is at a distance from the base station less than or equal to that of UE1 to enter a forwarding mode, the preset range may be set to cause that only forwarding of measured data of UEs having an uplink transmit power less than or equal to the uplink transmit power of UE1 is triggered.

In summary, according to the apparatus of this embodiment, forwarding of measured data is triggered according to an uplink transmit power of a mobile terminal, so as to facilitate reducing signaling overheads and delay caused by unnecessary forwarding, thereby improving the forwarding efficiency.

Figure 3B:
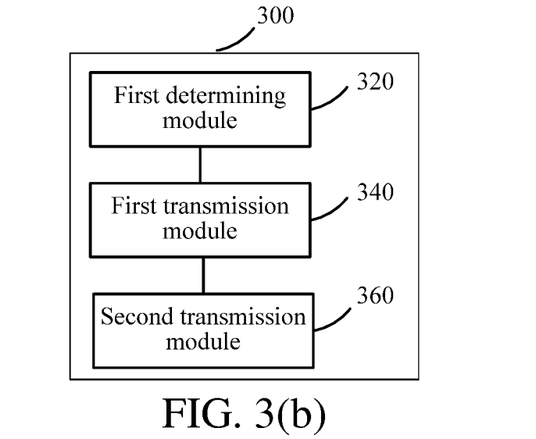

The indication information may comprise a forwarding request for the measured data. In an example embodiment, the at least one forwarding node may make a response to the received forwarding request, and the mobile terminal may send the measured data on the basis of the response. In this implementation manner, as shown in FIG. 3(b), the apparatus 300 of this embodiment comprises:

a second transmission module 360, configured to send the measured data in response to that a response to the forwarding request is received.

For example, the measured data is sent to a forwarding node that responds to the forwarding request and is determined as being capable of/suitable for forwarding the measured data for the mobile terminal.

In another example embodiment, the indication information may comprise a forwarding request for the measured data and the measured data, and the at least one forwarding node that receives the indication information may directly determine, according to the forwarding request, to forward the measured data.

In still another example embodiment, the mobile terminal and/or the measured data of the mobile terminal may also be given a certain forwarding priority, and the forwarding node forwards measured data from multiple mobile terminals according to different priorities, so as to help further improve the forwarding efficiency. In this implementation manner, the indication information may further comprise a forwarding priority of the measured data. The priority may be an inherent and fixed priority of the mobile device; or may be determined according to at least the measured data or and may change as the measured data changes. For example, it is deduced from a moving speed and a braking status of the mobile terminal that the mobile terminal is braking in emergency and may be in an accident scenario; therefore, the mobile terminal may set a relatively high forwarding priority for the measured data.

It should be noted that because the uplink transmit power of the mobile terminal may change, the first determining module 320 may implement its function in real time, regularly, or irregularly. In this implementation manner, the first transmission module 340 is also configured to stop, in response to that the uplink transmit power does not fall within the preset range, sending the forwarding request to the at least one forwarding node.

In this case, the mobile terminal still sends the measured data out, but the at least one forwarding node that receives the measured data no longer forwards the measured data.

Figure 3C:
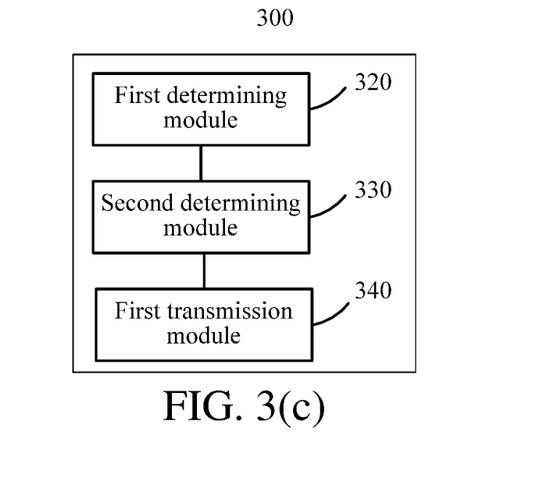

Further, in order to implement effective forwarding of the measured data, as shown in FIG. 3(c), the apparatus 300 of this embodiment of the present application may further comprise:

a second determining module 330, configured to determine a resource configuration associated with the measured data.

Figure 3D:
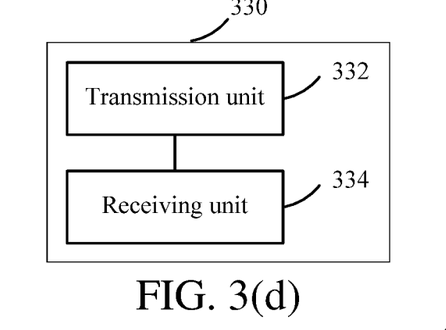

The resource configuration may comprise, but is not limited to, at least one of the following configurations associated with forwarding of the measured data: an ID used by the mobile terminal in sending the measured data and/or an ID used by the at least one forwarding node in forwarding the measured data, a resource used by the mobile terminal in sending the measured data and/or a resource used by the at least one forwarding node in forwarding the measured data, a maximum number of hops of the measured data, and the like. The second determining module 330 may determine the resource configuration by using any method that is mature in the art. For example, competing for available resource according to certain contention mechanism, or a dedicated resource previously allocated to the mobile terminal is determined. The second determining module 330 may also acquire the information associated with the resource configuration by communicating with the base station of the cell to which the mobile terminal attaches, to determine a dedicated resource that is reallocated by the base station to the mobile terminal. The first transmission module 340 sends the indication information according to the resource configuration determined by the second determining module 330, and a corresponding configuration setting is comprised in the indication information when necessary. In addition, in this implementation manner, as shown in FIG. 3(d), the second determining module 330 further comprises:

a transmission unit 332, configured to send a resource configuration request to a base station of a cell to which the mobile terminal attaches; and a receiving unit 334, configured to receive sent information that is associated with the resource configuration, for example, receive information that is associated with the resource configuration and that is from the base station of the cell to which the mobile terminal attaches.

In addition, the mobile terminal may send the measured data to the at least one forwarding node by using various suitable communication modes, so as to implement forwarding in different coverage areas.

In an example embodiment, the first transmission module 340 may send the indication information by using the DSRC communication mode; in this implementation manner, the at least one forwarding node at least comprises a neighboring mobile terminal of the mobile terminal and may also comprise a fixed device (for example, an intelligent traffic light) within a transmission distance of a DSRC signal of the mobile device. In another example embodiment, the first transmission module 340 may send the indication information to the at least one forwarding node by using the D2D communications technology; in this implementation manner, the at least one forwarding node still comprises at least a neighboring mobile terminal of the mobile terminal and may also comprise a fixed device (for example, an intelligent traffic light) within a transmission distance of a DSRC signal of the mobile device. In still another example embodiment, the at least one forwarding node comprises a base station of a cell to which the mobile terminal attaches, and the first transmission module 340 may send the indication information to at least the base station of the cell to which the mobile terminal attaches; in this implementation manner, the base station as a forwarding node may send the indication information to a mobile terminal in the serving cell according to a forwarding requirement for the measured data, or forward the indication information to another base station in a neighboring cell to enable the another base station in the neighboring cell to send the indication information to a mobile terminal in the cell covered by the another base station, so as to further expand the forwarding coverage area of the measured data of the mobile terminal; or, the base station may forward the indication information to a mobile terminal in the serving cell and another base station in a neighboring cell.

In summary, the apparatus of this embodiment can be used to implement effective forwarding of measured data of a mobile terminal.

The method and apparatus of the embodiments of the present application are further described below by using specific examples.

In the scenario shown in FIG. 1, UE1 and UE2 determine, according to that their uplink transmit powers are lower than a threshold, that their effective transmission ranges of V2V signals are very limited, and therefore send, while sending measured data, forwarding requests to trigger other UEs to forward the measured data of UE1 and UE2, thereby enlarging their coverage areas of V2V signals. If after travelling a distance, UE1 and UE2 determine that their uplink transmit powers exceed the threshold, UE1 and UE2 no longer add a forwarding request to the measured data sent by them.

Figure 4:
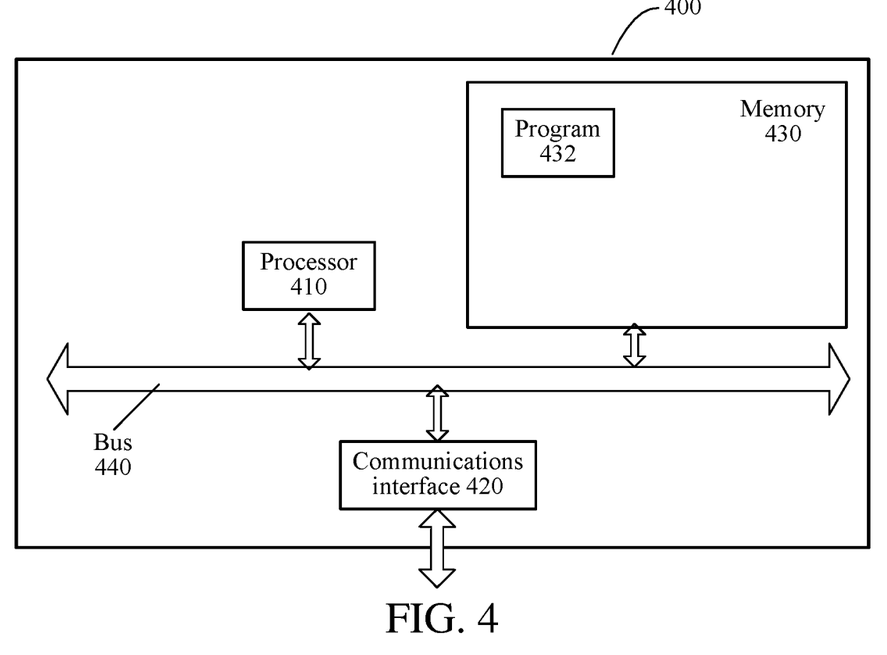
FIG. 4 is an example schematic structural diagram of another example of an information transmission apparatus for a mobile terminal according to an embodiment of the present application.

FIG. 4 is a schematic structural diagram of an information transmission apparatus 400 for a mobile terminal according to an embodiment of the present application. The specific embodiments of the present application are not intended to limit the specific implementation of the information transmission apparatus 400 for a mobile terminal. As shown in FIG. 4, the information transmission apparatus 400 for a mobile terminal may comprise:

a processor 410, a communications interface 420, a memory 430, and a communications bus 440.

The processor 410, the communications interface 420, and the memory 430 communicate with each other by using the communications bus 440.

The communications interface 420 is configured to communicate with a network element such as a client.

The processor 410 is configured to execute a program 432, and can specifically implement relevant functions of the information transmission apparatus for a mobile terminal in the apparatus embodiment shown in FIG. 3(a).

Specifically, the program 432 may comprise program code, wherein the program code comprises a computer operation instruction.

The processor 410 may be a central processing unit (CPU), an application specific integrated circuit (ASIC), or one or more integrated circuits configured to implement the embodiments of the present application. The program 432 may be used for enabling the information transmission apparatus 400 for a mobile terminal to perform the following steps:

determining an uplink transmit power of the mobile terminal; and sending, in response to that the uplink transmit power falls within a preset range, to at least one forwarding node, indication information for instructing to forward measured data of the mobile terminal.

For the specific implementation of the steps in the program 432, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Although the subject matter is described herein in the general context of program modules that execute in conjunction with an application program that runs on an operating system on a computer system, a person skilled in the art will recognize that the subject matter may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above example embodiments are only used to describe the present application, rather than limit the present application; various alterations and variants can be made by a person of ordinary skill in the art without departing from the spirit and scope of the present application, so all equivalent technical solutions also belong to the scope of the present application, and the scope of patent protection of the present application should be defined by claims.

What is claimed is:

1. A method for transmitting measured data from a first mobile terminal to a second mobile terminal, comprising:
    determining, by the first mobile terminal comprising a processor, an uplink transmit power of the first mobile terminal, wherein the uplink transmit power of the first mobile terminal is a maximum uplink D2D transmit power of the first mobile terminal, and according to the maximum uplink D2D transmit power of the first mobile terminal, a first maximum coverage area of a D2D signal of the first mobile terminal is estimated;
    sending, by the first mobile terminal in response to determining that the uplink transmit power falls within a preset range that corresponds to a second maximum coverage area external to which the second mobile terminal is located, to at least one forwarding node whose distance from a base station is no greater than another distance of the first mobile terminal from the base station, indication information for instructing the at least one forwarding node to forward measured data of the first mobile terminal, wherein the indication information comprises the measured data, a forwarding request for the measured data, and a forwarding priority of the measured data, wherein the measured data comprises information associated with at least two elements selected from a moving speed of the first mobile terminal, a location of the first mobile terminal, a moving direction of the first mobile terminal, or a braking of the first mobile terminal, and wherein the preset range is determined by the first mobile terminal or the base station according to at least a transmission requirement of the measured data, a congestion level of a transmission channel, a geographical location of the first mobile terminal, and a density of other mobile terminals in a region in which the first mobile terminal is located; and
    stopping, by the first mobile terminal in response to determining that the uplink transmit power does not fall within the preset range, the sending of the forwarding request to the at least one forwarding node, wherein the stopping the sending of the forwarding request comprises at least simultaneously sending the measured data to the at least one forwarding node.

2. The method of claim 1, further comprising
sending, by the first mobile terminal, the measured data in response to determining that a response to the forwarding request is received.

3. The method of claim 2, further comprising:
determining, by the first mobile terminal, a resource configuration associated with the measured data, and
wherein the sending, to the at least one forwarding node, the indication information for instructing to forward the measured data of the first mobile terminal comprises:
sending the indication information to the at least one forwarding node according to the resource configuration.

4. The method of claim 3, wherein the determining the resource configuration associated with the measured data comprises:
    sending a resource configuration request to another base station of a cell to which the first mobile terminal attaches; and
    receiving configuration information associated with the resource configuration.

5. The method of claim 1, further comprising:
    after the sending, to the at least one forwarding node, the indication information for instructing to forward the measured data of the first mobile terminal, sending, by the first mobile terminal, the indication information to the at least one forwarding node by using at least a dedicated short range communications (DSRC) technology.

6. The method of claim 1, wherein the sending, to the at least one forwarding node, the indication information for instructing to forward the measured data of the first mobile terminal comprises:
    sending the indication information to the at least one forwarding node by using at least a device to device communications technology.

7. The method of claim 1, wherein the at least one forwarding node comprises another base station of a cell to which the first mobile terminal attaches.

8. An apparatus for transmitting communications from a first mobile terminal to a second mobile terminal; wherein, the apparatus belongs to the first mobile terminal and the apparatus comprises:
a memory that stores executable modules; and
a processor, coupled to the memory, that executes or facilitates execution of the executable modules, the executable modules comprising:
a first determining module configured to determine an uplink transmit power of the first mobile terminal, wherein the uplink transmit power of the first mobile terminal is a maximum uplink D2D transmit power of the first mobile terminal, and according to the maximum uplink D2D transmit power of the first mobile terminal, a first maximum coverage area of a D2D signal of the first mobile terminal is estimated; and
a first transmission module configured to:
send, in response to a first determination that the uplink transmit power falls within a preset range that corresponds to a second maximum coverage area external to which the second mobile terminal is located, to at least one forwarding node whose distance from a base station is no greater than another distance of the first mobile terminal from the base station, indication information for instructing the at least one forwarding node to forward measured data of the first mobile terminal, wherein the indication information comprises a forwarding request for the measured data, the measured data, and a forwarding priority of the measured data, wherein the measured data comprises information associated with at least two elements selected from a moving speed of the first mobile terminal, a location of the first mobile terminal, a moving direction of the first mobile terminal, or a braking of the first mobile terminal, and wherein the preset range is determined by the first mobile terminal or the base station according to at least a transmission requirement of the measured data, a congestion level of a transmission channel, a geographical location of the first mobile terminal, and a density of other mobile terminals in a region in which the first mobile terminal is located, and
stop, in response to a second determination that the uplink transmit power does not fall within the preset range, sending the forwarding request to the at least one forwarding node, wherein the stop of the sending of the forwarding request comprises at least simultaneously sending the measured data to the at least one forwarding node.

9. The apparatus of claim 8, wherein the executable modules further comprise:
a second transmission module configured to send the measured data in response to a third determination that a response to the forwarding request is received.

10. The apparatus of claim 9, wherein the executable modules further comprise:
a second determining module configured to determine a resource configuration associated with the measured data, and the first transmission module is configured to send the indication information to the at least one forwarding node according to the resource configuration.

11. The apparatus of claim 10, wherein the second determining module comprises:
a transmission unit configured to send a resource configuration request to another base station of a cell to which the first mobile terminal attaches; and
a receiving unit configured to receive configuration information associated with the resource configuration.

12. The apparatus of claim 8, wherein the first transmission module is configured to send the indication information to the at least one forwarding node by using at least a dedicated short range communications (DSRC) technology.

13. The apparatus of claim 8, wherein the first transmission module is configured to send the indication information to the at least one forwarding node by using at least a long term evolution (LTE) device to device communications technology.

14. The apparatus of claim 8, wherein the at least one forwarding node comprises another base station of a cell to which the first mobile terminal attaches.

15. A non-transitory computer readable storage device, comprising at least one executable instruction, which, in response to execution, causes a first mobile terminal comprising a processor to perform operations for transmitting communications from the first mobile terminal to a second mobile terminal, comprising:
determining an uplink transmit power of the first mobile terminal, wherein the uplink transmit power of the first mobile terminal is a maximum uplink D2D transmit power of the first mobile terminal, and according to the maximum uplink D2D transmit power of the first mobile terminal, a first maximum coverage area of a D2D signal of the first mobile terminal is estimated;
sending, in response to determining that the uplink transmit power falls within a preset range that corresponds to a second maximum coverage area external to which the second mobile terminal is located, to a forwarding node whose distance from a base station is no greater than another distance of the first mobile terminal from the base station, indication information that instructs the forwarding node to forward measured data of the first mobile terminal, wherein the indication information comprises the measured data, a forwarding request for the measured data, and a forwarding priority of the measured data, wherein the measured data comprises information associated with at least two elements selected from a moving speed of the first mobile terminal, a location of the first mobile terminal, a moving direction of the first mobile terminal, or a braking of the first mobile terminal, and wherein the preset range is determined by the first mobile terminal or the base station according to at least a transmission requirement of the measured data, a congestion level of a transmission channel, a geographical location of the first mobile terminal, and a density of other mobile terminals in a region in which the first mobile terminal is located; and
stopping, by the first mobile terminal in response to determining that the uplink transmit power does not fall within the preset range, the sending of the forwarding request to the forwarding node, wherein the stopping the sending of the forwarding request comprises at least simultaneously sending the measured data to the forwarding node.

16. A device for communication transmission comprising a processor and memory, wherein the memory storing executable instructions, the processor being connected with the memory via a communication bus, and when the device is operating, the processor executes or facilitates execution of the executable instructions stored by the memory to perform operations:

determining an uplink transmit power of a first mobile terminal, wherein the uplink transmit power of the first mobile terminal is a maximum uplink D2D transmit power of the first mobile terminal, and according to the maximum uplink D2D transmit power of the first mobile terminal, a first maximum coverage area of a D2D signal of the first mobile terminal is estimated;

facilitating sending, by the first mobile terminal in response to determining that the uplink transmit power falls within a preset range that corresponds to a second maximum coverage area external to which a second mobile terminal is located, to a forwarding node whose distance from a base station is no greater than another distance of the first mobile terminal from the base station, indication information that instructs the forwarding node to forward measured data of the first mobile terminal, wherein the indication information comprises the measured data, a forwarding request for the measured data, and a forwarding priority of the measured data, wherein the measured data comprises information associated with at least two elements selected from a moving speed of the first mobile terminal, a location of the first mobile terminal, a moving direction of the first mobile terminal, or a braking of the first mobile terminal, and wherein the preset range is determined by the first mobile terminal or the base station according to at least a transmission requirement of the measured data, a congestion level of a transmission channel, a geographical location of the first mobile terminal, and a density of other mobile terminals in a region in which the first mobile terminal is located; and facilitating stopping, by the first mobile terminal in response to determining that the uplink transmit power does not fall within the preset range, the sending of the forwarding request to the forwarding node, wherein the stopping the sending of the forwarding request comprises at least simultaneously sending the measured data to the forwarding node.

17. The device of claim 16, wherein the forwarding node comprises another base station of a cell to which the first mobile terminal attaches.

18. The non-transitory computer readable storage device of claim 15, wherein the forwarding node comprises another base station of a cell to which the first mobile terminal attaches.

19. The non-transitory computer readable storage device of claim 15, wherein the indication information is sent to the forwarding node by using at least a dedicated short range communications (DSRC) technology.

20. The non-transitory computer readable storage device of claim 15, wherein the indication information is sent to the forwarding node by using at least a long term evolution (LTE) device to device communications technology.

21. The device of claim 16, wherein the indication information is sent to the forwarding node by using at least a long term evolution (LTE) device to device communications technology.

* * * * *